(12) United States Patent
Kar et al.

(10) Patent No.: US 11,640,630 B2
(45) Date of Patent: May 2, 2023

(54) SYSTEMS AND METHODS FOR VERIFYING IDENTITY OF A USER ON AN EQUIPMENT ONLINE MARKETPLACE PLATFORM

(71) Applicant: Honeywell International Inc., Morris Plains, NJ (US)

(72) Inventors: Satyanarayan Kar, Karnataka (IN); Lisa Estipona Butters, Chandler, AZ (US); Sujay Rao, Karnataka (IN); Keerthi Jayarajan, Tamilnadu (IN); Sravan Kommuri, Hyperbad (IN); Sathish Muthukrishnan, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 777 days.

(21) Appl. No.: 16/531,491

(22) Filed: Aug. 5, 2019

(65) Prior Publication Data

US 2020/0151787 A1    May 14, 2020

Related U.S. Application Data

(60) Provisional application No. 62/758,197, filed on Nov. 9, 2018.

(51) Int. Cl.
| G06Q 30/06 | (2012.01) |
| G06F 16/23 | (2019.01) |
| G06Q 30/0601 | (2023.01) |

(52) U.S. Cl.
CPC ..... G06Q 30/0609 (2013.01); G06F 16/2308 (2019.01)

(58) Field of Classification Search
CPC .......... G06F 16/23–2393; G06Q 30/06–0645; G06Q 30/08; G06Q 50/01; G16Y 10/00–90
See application file for complete search history.

(56) References Cited

U.S. PATENT DOCUMENTS

| 4,799,156 A | 1/1989 | Shavit et al. |
| 6,249,773 B1 | 6/2001 | Allard et al. |

(Continued)

OTHER PUBLICATIONS

L. A. Cutillo, R. Molva and M. Önen, "PRICE: Privacy preserving incentives for cooperation enforcement," 2012 IEEE International Symposium on a World of Wireless, Mobile and Multimedia Networks (WoWMoM), 2012, pp. 1-9. (Year: 2012).*

*Primary Examiner* — Adam L Levine
(74) *Attorney, Agent, or Firm* — Bookoff McAndrews, PLLC

(57) ABSTRACT

A method for verifying an identity of a new user of an equipment online marketplace platform is disclosed. The method may include: receiving a request from a new user to join an equipment online marketplace network to trade equipment through the equipment online marketplace platform; broadcasting a message to existing users to verify and endorse an identity of the new user to allow the new user to join the equipment online marketplace network to trade equipment through the equipment online marketplace platform; receiving endorsements of the identity of the new user from the existing users; if the identity of the new user is endorsed by a threshold number of existing users, permitting the new user to join the equipment online marketplace network and trade equipment through the equipment online marketplace platform; and storing the identity of the new user as a blockchain entry in a shared ledger.

20 Claims, 4 Drawing Sheets

(56) References Cited

U.S. PATENT DOCUMENTS

| | | |
|---|---|---|
| 6,266,649 B1 | 7/2001 | Linden et al. |
| 6,343,275 B1 | 1/2002 | Wong |
| 6,512,919 B2 | 1/2003 | Ogasawara |
| 6,535,880 B1 | 3/2003 | Musgrove et al. |
| 6,556,904 B1 | 4/2003 | Larson et al. |
| 6,564,192 B1 | 5/2003 | Kinney, Jr. et al. |
| 6,609,132 B1 | 8/2003 | White et al. |
| 6,611,814 B1 | 8/2003 | Lee et al. |
| 6,671,674 B1 | 12/2003 | Anderson et al. |
| 6,704,716 B1 | 3/2004 | Force |
| 6,732,161 B1 | 5/2004 | Hess et al. |
| 6,847,938 B1 | 1/2005 | Moore |
| 6,850,899 B1 | 2/2005 | Chow et al. |
| 6,850,917 B1 | 2/2005 | Hom et al. |
| 6,879,985 B2 * | 4/2005 | Deguchi ............... H04L 67/306 707/999.102 |
| 6,901,377 B1 | 5/2005 | Rosenfeld et al. |
| 6,901,430 B1 | 5/2005 | Smith |
| 6,904,410 B1 | 6/2005 | Weiss et al. |
| 6,915,271 B1 | 7/2005 | Meyer et al. |
| 6,917,922 B1 | 7/2005 | Bezos et al. |
| 6,925,444 B1 | 8/2005 | McCollom et al. |
| 6,965,882 B1 | 11/2005 | Lapstun et al. |
| 6,980,963 B1 | 12/2005 | Hanzek |
| 7,024,376 B1 | 4/2006 | Yuen |
| 7,054,824 B1 | 5/2006 | Grenchus, Jr. et al. |
| 7,058,602 B1 | 6/2006 | LaMura et al. |
| 7,062,460 B1 | 6/2006 | Growney et al. |
| 7,082,426 B2 | 7/2006 | Musgrove et al. |
| 7,103,567 B2 | 9/2006 | Smukowski |
| 7,107,226 B1 | 9/2006 | Cassidy et al. |
| 7,107,227 B1 | 9/2006 | Bezos et al. |
| 7,120,672 B1 | 10/2006 | Szeto et al. |
| 7,263,498 B1 | 8/2007 | Van Horn et al. |
| 7,296,033 B1 | 11/2007 | Lynch |
| 7,315,832 B2 | 1/2008 | Bauer et al. |
| 7,315,833 B2 | 1/2008 | Schrenk |
| 7,330,082 B2 | 2/2008 | Hung et al. |
| 7,330,826 B1 | 2/2008 | Porat et al. |
| 7,373,317 B1 | 5/2008 | Kopelman et al. |
| 7,376,599 B1 | 5/2008 | Gerhardt |
| 7,376,613 B1 | 5/2008 | Cofino et al. |
| 7,383,206 B2 | 6/2008 | Rupp et al. |
| 7,389,294 B2 | 6/2008 | Kotas et al. |
| 7,424,457 B2 | 9/2008 | Khaishgi et al. |
| 7,472,076 B2 | 12/2008 | Garg et al. |
| 7,472,077 B2 | 12/2008 | Roseman et al. |
| 7,478,054 B1 | 1/2009 | Adams et al. |
| 7,493,274 B2 | 2/2009 | Bezos et al. |
| 7,497,369 B2 | 3/2009 | Dalzell et al. |
| 7,533,364 B2 | 5/2009 | Ramaswamy et al. |
| 7,533,369 B2 | 5/2009 | Sundararajan et al. |
| 7,594,189 B1 | 9/2009 | Walker et al. |
| 7,603,653 B2 | 10/2009 | Sundararajan et al. |
| 7,610,219 B2 | 10/2009 | Sayed |
| 7,614,552 B2 | 11/2009 | Roseman et al. |
| 7,617,128 B2 | 11/2009 | Greak |
| 7,640,251 B2 | 12/2009 | Sundararajan et al. |
| 7,647,243 B2 | 1/2010 | Woolston |
| 7,657,542 B2 | 2/2010 | Sundararajan et al. |
| 7,660,740 B2 | 2/2010 | Boone et al. |
| 7,665,085 B2 | 2/2010 | Sundararajan et al. |
| 7,668,821 B1 | 2/2010 | Donsbach et al. |
| 7,698,169 B2 | 4/2010 | Raccah et al. |
| 7,702,540 B1 | 4/2010 | Woolston |
| 7,720,833 B1 | 5/2010 | Wen et al. |
| 7,739,148 B2 | 6/2010 | Suzuki et al. |
| 7,774,238 B2 | 8/2010 | Gopalpur et al. |
| 7,774,305 B2 | 8/2010 | Devalla et al. |
| 7,793,258 B2 | 9/2010 | Sundararajan et al. |
| 7,813,967 B2 | 10/2010 | Kopelman et al. |
| 7,835,945 B2 | 11/2010 | Scruton et al. |
| 7,840,558 B2 | 11/2010 | Wiseman et al. |
| 7,877,353 B2 | 1/2011 | Ahmed et al. |
| 7,881,985 B2 | 2/2011 | Yang et al. |
| 7,908,180 B2 | 3/2011 | Goclowski |
| 7,921,052 B2 | 4/2011 | Dabney et al. |
| 7,945,480 B2 | 5/2011 | Scruton et al. |
| 7,966,243 B2 | 6/2011 | Taylor et al. |
| 7,979,340 B2 | 7/2011 | MacDonald Korth et al. |
| 7,980,466 B2 | 7/2011 | Lee et al. |
| 7,983,809 B2 | 7/2011 | Kell et al. |
| 7,983,963 B2 | 7/2011 | Byrne et al. |
| 8,019,650 B2 | 9/2011 | Donsbach et al. |
| 8,041,611 B2 | 10/2011 | Kleinrock et al. |
| 8,108,260 B2 | 1/2012 | Maguire et al. |
| 8,170,915 B2 | 5/2012 | Borders et al. |
| 8,185,552 B1 | 5/2012 | Chow et al. |
| 8,209,300 B2 | 6/2012 | Malkowicz et al. |
| 8,209,660 B2 | 6/2012 | Sundararajan et al. |
| 8,244,666 B2 | 8/2012 | Loftus et al. |
| 8,245,150 B2 | 8/2012 | Katter, Jr. et al. |
| 8,255,291 B1 | 8/2012 | Nair |
| 8,266,014 B1 | 9/2012 | Bhosle et al. |
| 8,307,339 B2 | 11/2012 | Sundararajan et al. |
| 8,311,896 B2 | 11/2012 | Mesaros |
| 8,311,900 B1 | 11/2012 | Bates et al. |
| 8,321,293 B2 | 11/2012 | Lewis et al. |
| 8,326,662 B1 | 12/2012 | Byrne et al. |
| 8,335,822 B2 | 12/2012 | Ahmed et al. |
| 8,352,328 B2 | 1/2013 | Woolston |
| 8,370,269 B2 * | 2/2013 | MacDonald-Korth ..................... G06Q 30/0282 705/319 |
| 8,392,297 B2 | 3/2013 | Bowser et al. |
| 8,412,594 B2 | 4/2013 | Kundu |
| 8,463,658 B2 | 6/2013 | Racco |
| 8,510,298 B2 | 8/2013 | Khandelwi |
| 8,521,609 B2 | 8/2013 | Lewis et al. |
| 8,572,563 B2 | 10/2013 | Sundararajan et al. |
| 8,577,747 B1 | 11/2013 | Krechel et al. |
| 8,583,480 B2 | 11/2013 | Byrne |
| 8,676,654 B2 | 3/2014 | Lawton |
| 8,687,104 B2 | 4/2014 | Penov et al. |
| 8,719,075 B2 | 5/2014 | MacDonald Korth et al. |
| 8,725,581 B2 | 5/2014 | Breed et al. |
| 8,737,729 B2 | 5/2014 | Bhardwaj et al. |
| 8,745,478 B2 | 6/2014 | Braun et al. |
| 8,819,619 B2 | 8/2014 | Sundararajan et al. |
| 8,935,286 B1 | 1/2015 | Westerman, Jr. et al. |
| 9,009,658 B2 | 4/2015 | Sundararajan et al. |
| 9,043,232 B1 | 5/2015 | Varadarajan |
| 9,092,523 B2 | 7/2015 | Tanne et al. |
| 9,213,839 B2 | 12/2015 | Cao et al. |
| 9,230,238 B2 | 1/2016 | Zappa et al. |
| 9,405,773 B2 | 8/2016 | Chittar et al. |
| 9,418,050 B1 | 8/2016 | Brewster |
| 9,436,754 B1 | 9/2016 | Hu et al. |
| 9,483,788 B2 | 11/2016 | Martin |
| 9,495,697 B2 | 11/2016 | Williams et al. |
| 9,692,738 B1 | 6/2017 | Wenneman et al. |
| 9,704,194 B2 | 7/2017 | Grove et al. |
| 9,715,542 B2 | 7/2017 | Lu et al. |
| 9,747,622 B1 | 8/2017 | Johnson et al. |
| 9,767,505 B1 | 9/2017 | Shi |
| 9,779,451 B2 | 10/2017 | Fisher |
| 9,805,425 B2 | 10/2017 | MacDonald Korth et al. |
| 9,830,632 B2 | 11/2017 | Lenahan et al. |
| 9,904,949 B1 | 2/2018 | Tavernier |
| 9,934,544 B1 | 4/2018 | Whitfield et al. |
| 9,953,365 B2 | 4/2018 | Friedman |
| 10,841,100 B2 * | 11/2020 | Lam ..................... H04L 9/3239 |
| 2002/0006576 A1 | 1/2002 | Sato et al. |
| 2002/0120537 A1 | 8/2002 | Morea et al. |
| 2005/0203764 A1 | 9/2005 | Sundararajan et al. |
| 2005/0203865 A1 | 9/2005 | Sundararajan et al. |
| 2005/0203871 A1 | 9/2005 | Devalla et al. |
| 2005/0203913 A1 | 9/2005 | Sundararajan et al. |
| 2005/0203942 A1 | 9/2005 | Sundararajan et al. |
| 2005/0203955 A1 | 9/2005 | Ramaswamy et al. |
| 2005/0204201 A1 | 9/2005 | Meenakshisundaram et al. |
| 2005/0204332 A1 | 9/2005 | Krishnan et al. |
| 2005/0204334 A1 | 9/2005 | Parthasarathy et al. |
| 2005/0204354 A1 | 9/2005 | Sundararajan et al. |

(56) References Cited

U.S. PATENT DOCUMENTS

| | | |
|---|---|---|
| 2005/0204356 A1 | 9/2005 | Sundararajan et al. |
| 2005/0210442 A1 | 9/2005 | Seetharaman et al. |
| 2005/0216881 A1 | 9/2005 | Sankaran et al. |
| 2005/0216882 A1 | 9/2005 | Sundararajan et al. |
| 2005/0216890 A1 | 9/2005 | Sundararajan et al. |
| 2005/0216891 A1 | 9/2005 | Sundararajan et al. |
| 2009/0024980 A1 | 1/2009 | Sundararajan et al. |
| 2009/0246547 A1 | 1/2009 | Sundararajan et al. |
| 2009/0300585 A1 | 12/2009 | Meenakshisundaram et al. |
| 2010/0058287 A1 | 3/2010 | Sundararajan et al. |
| 2010/0325606 A1 | 12/2010 | Sundararajan et al. |
| 2012/0131543 A1 | 5/2012 | Sundararajan et al. |
| 2014/0137217 A1* | 5/2014 | Kowalchyk ............ G06Q 50/01 726/5 |
| 2014/0372252 A1* | 12/2014 | Raney ................ G06Q 30/0615 705/26.35 |
| 2018/0293547 A1* | 10/2018 | Randhawa ............ H04L 9/3239 |
| 2019/0349371 A1* | 11/2019 | Smith ................... H04L 9/3268 |

\* cited by examiner

SYSTEMS AND METHODS FOR VERIFYING IDENTITY OF A USER ON AN EQUIPMENT ONLINE MARKETPLACE PLATFORM

CROSS-REFERENCE TO RELATED APPLICATION(S)

This application claims the benefit of priority to U.S. Provisional Patent Application No. 62/758,197, filed Nov. 9, 2018, the entirety of which is incorporated by reference herein.

TECHNICAL FIELD

Various embodiments of the present disclosure relate generally to an equipment online marketplace platforms for trading equipment and, more particularly, to systems and methods for verifying identity of users on an equipment online marketplace platform.

BACKGROUND

Traditionally, equipment, such as aerospace parts, may be bought and sold in primary and secondary safety-critical marketplaces. Such marketplaces typically include brochure inquiries, often relying on intermediaries which require buyers and sellers to have several conversations to assess the correctness of information/attributes tied to the equipment before a deal is made to sell the equipment. Today, approximately $4 billion of aerospace parts are traded annually throughout the world. However, less than 2% of the aerospace parts commerce is conducted through online marketplaces, such as e-commerce websites. In the aerospace industry, it is difficult to establish such an equipment online marketplace platform because there exists a lack of trust between the buyers and sellers on the online marketplace.

Buyers may lack trust in sellers in an equipment online marketplace for various reasons. First, buyers of equipment may lack trust in a seller's identity over the equipment online marketplace. Second, buyers may lack trust in a seller's posted listing. For example, ghost listings may be a problem in which sellers post equipment information while not physically having the equipment/inventory in possession. Third, buyers may also lack trust on the information/attributes of the posted listings, mapping to the physical equipment.

Likewise, sellers may lack trust in buyers in an equipment online marketplace for various reasons. First, sellers of equipment may lack trust in a buyer's identity over the equipment online marketplace. Second, sellers may lack trust in the mode of payment for the equipment from the buyer.

Furthermore, equipment trading, such as aerospace parts trading, may be spread between several high assets, such as airlines, airports, aircrafts, and/or original equipment manufacturers (OEMs). For example, highly demanding time-constrained services, such as airport gates and runways, may be traded. However, there is currently no integrated equipment online marketplace that integrates these resources amongst the various participants (e.g., airlines, airports, aircrafts, and OEMs).

The present disclosure is directed to overcoming one or more of these above-referenced challenges.

SUMMARY OF THE DISCLOSURE

In one aspect, a computer-implemented method for verifying an identity of a new user of an equipment online marketplace platform is disclosed. The method may include: receiving, by a server executing the equipment online marketplace platform through a network, a request from a new user to join an equipment online marketplace network to trade equipment through the equipment online marketplace platform; broadcasting, by the server, a message to existing users to verify and endorse an identity of the new user to allow the new user to join the equipment online marketplace network to trade equipment through the equipment online marketplace platform; receiving, by the server, endorsements of the identity of the new user from the existing users through the equipment online marketplace platform; if the identity of the new user is endorsed by a threshold number of existing users, permitting, by the server, the new user to join the equipment online marketplace network and trade equipment through the equipment online marketplace platform; and storing, by the server, the identity of the new user as a blockchain entry in a shared ledger.

In another aspect, a system for verifying an identity of a new user of an equipment online marketplace platform is disclosed. The system may include: a memory having processor-readable instructions therein; and at least one processor configured to access the memory and execute the processor-readable instructions, which when executed by the processor configures the processor to perform a plurality of functions, including functions for: receiving, by a server executing the equipment online marketplace platform through a network, a request from a new user to join an equipment online marketplace network to trade equipment through the equipment online marketplace platform; broadcasting, by the server, a message to existing users to verify and endorse an identity of the new user to allow the new user to join the equipment online marketplace network to trade equipment through the equipment online marketplace platform; receiving, by the server, endorsements of the identity of the new user from the existing users through the equipment online marketplace platform; if the identity of the new user is endorsed by a threshold number of existing users, permitting, by the server, the new user to join the equipment online marketplace network and trade equipment through the equipment online marketplace platform; and storing, by the server, the identity of the new user as a blockchain entry in a shared ledger.

In yet another aspect, a non-transitory computer-readable medium containing instructions for facilitating equipment trading through an equipment online marketplace platform is disclosed. The instructions may include instructions for: receiving, by a server executing the equipment online marketplace platform through a network, a request from a new user to join an equipment online marketplace network to trade equipment through the equipment online marketplace platform; broadcasting, by the server, a message to existing users to verify and endorse an identity of the new user to allow the new user to join the equipment online marketplace network to trade equipment through the equipment online marketplace platform; receiving, by the server, endorsements of the identity of the new user from the existing users through the equipment online marketplace platform; if the identity of the new user is endorsed by a threshold number of existing users, permitting, by the server, the new user to join the equipment online marketplace network and trade equipment through the equipment online marketplace platform; and storing, by the server, the identity of the new user as a blockchain entry in a shared ledger.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
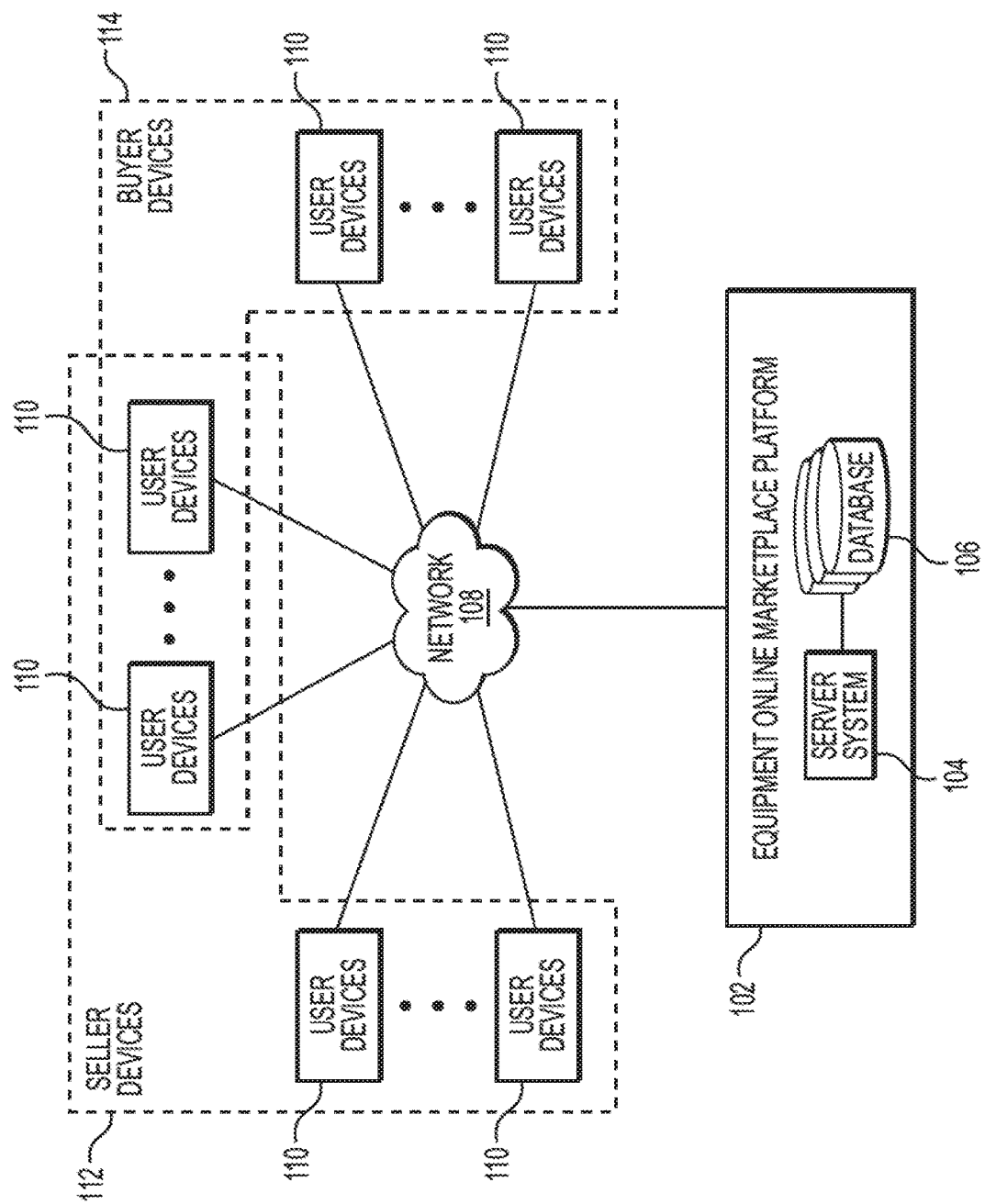
FIG. 1 depicts a block diagram of a system for an equipment online marketplace, according to aspects of the disclosure.

The following embodiments describe systems and methods for verifying user identity on an equipment online marketplace platform. The following embodiments further describe systems and methods for verifying equipment identity information on an equipment online marketplace platform. As used herein, "equipment" may include products or services traded in primary and secondary marketplaces among organizations. As such, "equipment" may include, for example, aircraft, aerospace parts and components, time-constrained equipment/services such as airport gates and runways, or any other aerospace-related product or service traded among airlines, airports, aircraft, or aerospace OEMs. While the exemplary equipment online marketplace platform of the present disclosure relates to aerospace equipment, "equipment" may also include any type of vehicle (e.g., automobile, boat, spacecraft, etc.), vehicle parts and components, vehicle services, heavy equipment, heavy equipment parts and components, heavy equipment services, computing devices, computing device parts and components, computing device services, or any other products or services traded in primary and secondary marketplaces among organizations.

As described above, it is difficult to establish trust among buyers and sellers in an equipment online marketplace, such as an aerospace parts online marketplace. Embodiments of the present disclosure provide solutions to these barriers by providing a new workflow enabled by using blockchain and other assistive technologies to help increase the trust in an equipment online marketplace platform trading, for example, in safety-critical systems such as aerospace parts. The equipment online marketplace platform of the present disclosure is differentiated by establishing trust. For example, embodiments of the present disclosure allow buyers to trust sellers' digital identities by establishing trusted sellers by the equipment online marketplace.

A blockchain-enabled equipment online marketplace may increase the overall trust in the system by introducing a consensus-based accreditation method. For example, the consensus-based accreditation method allows for trust on the digital identities of all participants (i.e., users) of the network, such as sellers, buyers, original equipment manufacturers (OEMs) and their internal sub-organizations. In some embodiments, smart contracts may be used to verify the digital identity of a user. As used herein, a "smart contract" is a computer code stored in the blockchain shared ledger containing a set of pre-defined rules under which parties to the contract agree to interact with each other. When the pre-defined rules are met, the contract, or agreement, may be automatically enforced. For example, the smart contract for the equipment may include a clause (or rule) for performing maintenance on the equipment by a set date.

Embodiments of the present disclosure further use a set of stepped methods that allow the operations to be transparent and may allow automating the processes above while coordinating the transactions on the equipment online marketplace platform. Embodiments of the present disclosure may further comprise initial trusted identities represented by organization nodes of the blockchain network. The task of establishing trusted users may be streamlined by the set of steps as described below.

The subject matter of the present disclosure will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

Referring now to the appended drawings, FIG. 1 depicts a block diagram of a system 100 for an equipment online marketplace, according to aspects of the disclosure. As shown in FIG. 1, the system 100 for an equipment online marketplace may include an equipment online marketplace platform 102, such as an aerospace parts online marketplace platform, including server systems 104 and shared databases 106. The server systems 104 may store and execute the equipment online marketplace platform 102 for use through a network 108, such as the Internet. The equipment online marketplace platform 102 may be implemented through one or more server systems 104, such as an application program interface (API) server, web page servers, image servers, listing servers, processing servers, search servers, or any other types of front-end or back-end servers.

Users may access the equipment online marketplace platform 102 through the network 108 by user devices 110. User devices 110 may allow a user to display a Web browser for accessing the equipment online marketplace platform 102 from the server system 104 through the network 108. The user devices 110 may be any type of device for accessing Web pages, such as personal computing devices, mobile computing devices, or the like. User devices 110 may be seller devices 112 or buyer devices 114. As such, users may be sellers and/or buyers through the equipment online marketplace platform 102. As further shown in FIG. 1, user devices 110 may be both seller devices 112 and buyer devices 114. Thus, users may access the equipment online marketplace platform 102 as both sellers and buyers.

Further, the equipment online marketplace platform 102 may provide a seller interface and a buyer interface. The seller interface may be displayed to a user accessing the equipment online marketplace platform 102 as a seller on a user device 110. The seller interface may include features to enable a seller to enter, or input, the information of the equipment that the seller desires to sell through the equipment online marketplace platform 102. For example, the seller interface may allow a seller to create, edit, or delete equipment listings based on the information of corresponding equipment. The buyer interface may be displayed to a user accessing the equipment online marketplace as a buyer on a user device 110. The buyer interface may include features to enable a buyer to search for, select, and purchase equipment from an equipment listing created by a seller.

As discussed above, the equipment online marketplace platform for trading equipment may provide features for establishing trust among users of the equipment online marketplace platform. For example, the task of establishing trusted users may include a shared database 106, such as a blockchain shared ledger.

Figure 2:
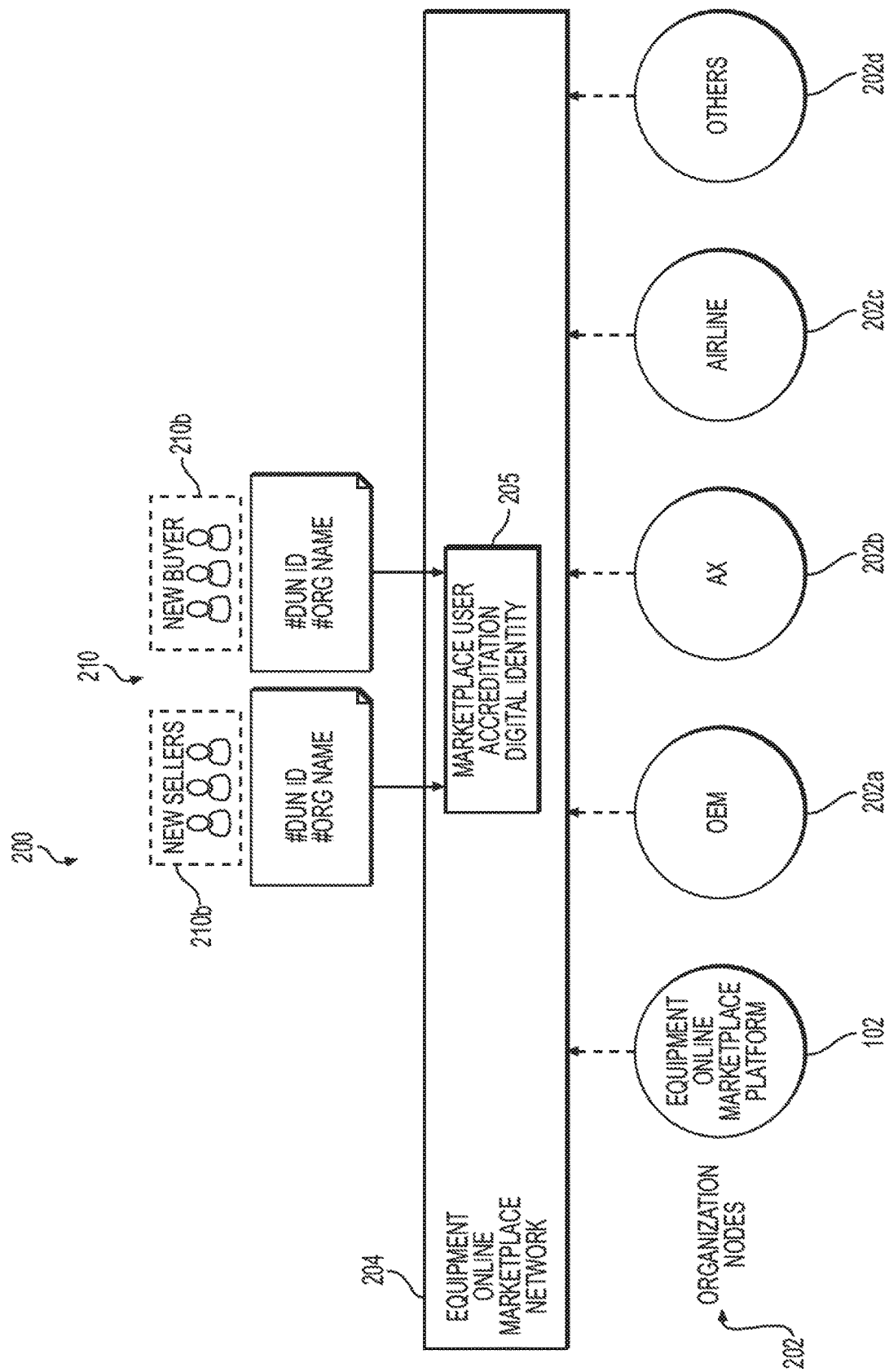
FIG. 2 depicts a block diagram of a blockchain-based equipment online marketplace network.

FIG. 2 depicts a block diagram of a blockchain-based equipment online marketplace 200. As shown in FIG. 2, the blockchain-based equipment online marketplace 200 may include organization nodes 202 connected to an equipment online marketplace network 204. The organization nodes 202 may include organizations that sell and/or buy equipment, such as aerospace parts. For example, the organization nodes may include OEMs 202a, airports (AX) 202b, airlines 202c, or other sellers and/or buyers 202n of aerospace parts or any other equipment. The organization nodes 202 may further include the organization maintaining and implementing the equipment online marketplace platform 102, implemented on the server systems 104.

The organization nodes 202 may include existing users of the equipment online marketplace platform 102. The existing users may be member organizations (e.g., organization nodes 202) of the equipment online marketplace network 204. The member organizations may include organizations with market credibility within the equipment online marketplace network 204. The member organizations may include various types of accreditors that may assist in verifying identities of the new users 210, as further detailed below. Member organizations of the equipment online marketplace network 204 may include roles such as, for example, a seller role and/or a buyer role. The roles may further include specific roles for the various types of accreditors. For example, the specific roles may include aircraft parts supplier, aircraft disassembly and recycling organizations, part shipper, environmental agencies, OEM part number manufacturing license, or any other specific roles for sellers and/or buyers on the equipment online marketplace platform 102.

In the blockchain-enabled equipment online marketplace 200, the organization nodes 202 may act as nodes in a blockchain network. As such, the nodes may be distributed across a widespread network and may carry out a variety of tasks. The nodes may include user devices 110, connected to the network 108, as described above. The nodes may support the online marketplace network 204 by maintaining a copy of a blockchain shared ledger, such as shared database 106. The organization nodes 202 may contribute to the task of validating user identities, as further described below.

The equipment online marketplace network 204 may include tasks and/or other services provided by the equipment online marketplace 200. The organization nodes 202 may carry out a number of the tasks of the equipment online marketplace 200 of the present disclosure. For example, the equipment online marketplace network 204 may include a task 205 of establishing trusted users.

The task 205 of establishing trusted users may include a marketplace user accreditation digital identity method. The marketplace user accreditation digital identity method may establish trusted digital identities of new users 210 (e.g., sellers 210a and/or buyers 210b) by secure smart contractual rules to allow new user identities into the system. The marketplace user accreditation digital identity method may include rules to cross verify the identity of the new users 210, such as an organization, by verifying basic information submitted to the network by the organization. For example, each new user 210 may include a business entity, or organization, having a unique numeric identifier, such as a DUN number ID, for identifying the new user 210.

When a new user 210 requests to join the equipment online marketplace network 204, the new user 210 may be required to comply with a minimum equipment network compliance. For example, an industry standard may be used to determine the minimum equipment network compliance. In one embodiment for aerospace parts, a new user 210 may be required to comply with aviation industry standards for digital information security (e.g., A4A Spec 42). If the new user 210 is determined to have passed the minimum equipment network compliance, the new user 210 may be accepted to be allowed to join the equipment online marketplace network 204 as a guest organization with minimum roles until an identity of the new user 210 is verified by the existing users. Prior to identity verification, a new user 210 that has passed the minimum equipment network compliance may be allowed to submit basic transactions through the equipment online marketplace platform 102. For example, the new user 210 may search for equipment or may request authorization for specific roles (e.g., parts supplier if the new user 210 is a seller).

Smart contracts, through the server system 104, may be used to verify the identity of the new user 210. The new user 210 may submit identity information of the new user 210 through the equipment online marketplace platform 102. For example, the new user 210 may submit any specific roles assigned to the new user 210, the DUN ID of the new user 210, types of accreditation the new user 210 owns, corresponding certificate numbers, and/or corresponding certificate expiry. The types of accreditation may be one or more of those listed above. For example, if the new user 210 is an aircraft dismantler, the new user 210 may provide for accreditation for aircraft disassembly, international crating, or environmental accreditation.

After the new user 210 submits identity information, the server system 104 (via the smart contract) may proceed to verify the information. For example, endorsing nodes (organizations) may verify the information from specific minimum accreditor types (e.g., verified by aircraft disassembly and environmental accreditors). Upon receiving verification of certificate information from the smart contract, endorsing nodes may compute an invite code. The smart contract may then retrieve the new user 210 email identification registered with the accreditor. The smart contract may encrypt the invite code with new user 210 public certificate. The endorsing nodes may trigger a lead node (e.g., an accreditor) to send the encrypted invite code to the registered email of the new user 210. The new user 210 may receive and decrypt the invite code. The new user 210 may then submit a transaction that informs the smart contract that the new user 210 has received the invite code. The endorsing nodes may then reference the blockchain shared ledger 106 to determine if the invite code in the new user 210 transaction matches the invite code that the endorsing nodes sent to the new user 210. If the invite codes match, the new user 210 may join the equipment online marketplace network 204. The identity of the new user 210 may be stored in the blockchain shared ledger 106. The role and specific role of the new user 210 may also be stored in the blockchain shared ledger 106.

Figure 3:
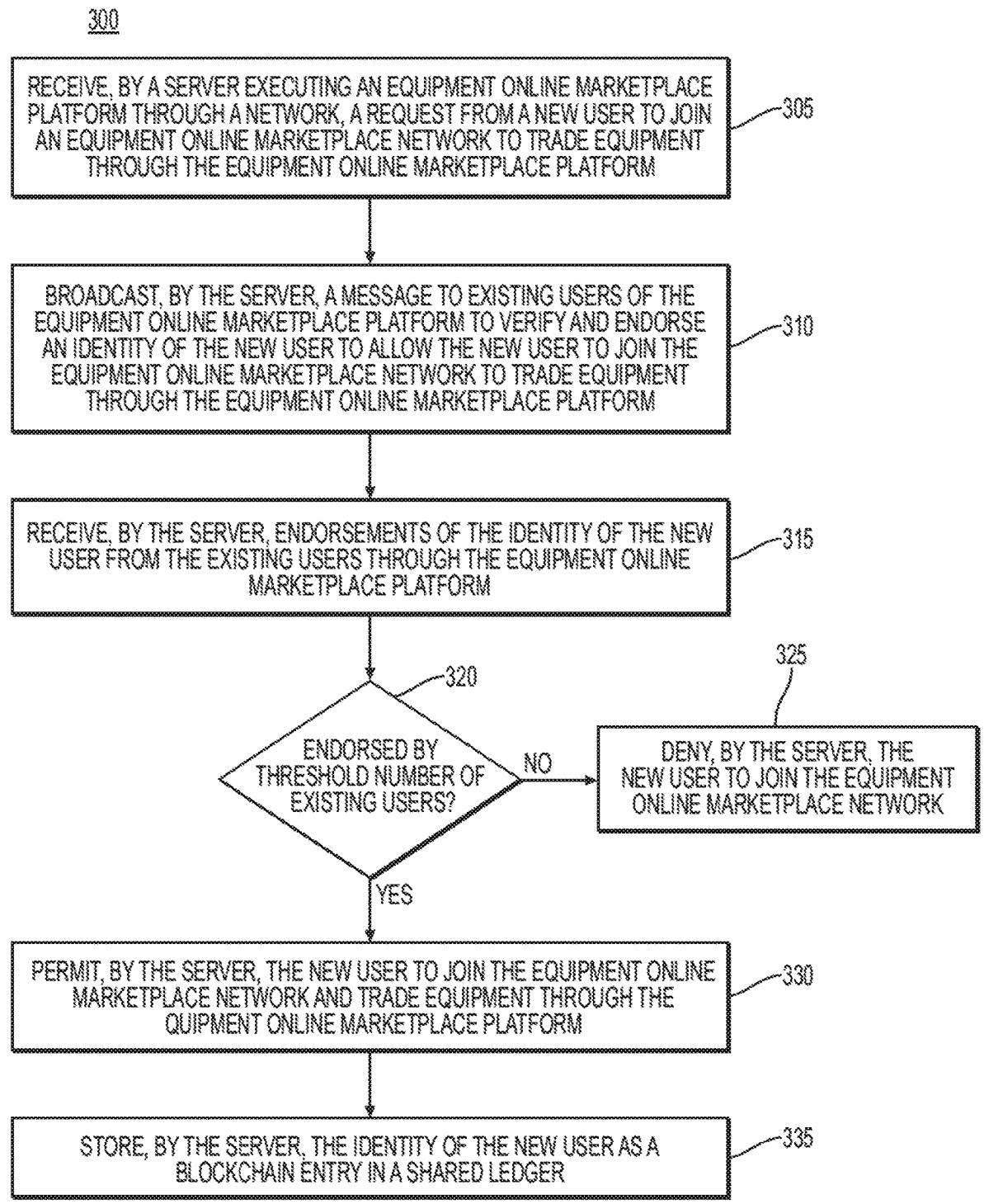
FIG. 3 depicts a flow diagram of an exemplary method for verifying an identity of a new user of the equipment online marketplace network of FIG. 2.

FIG. 3 depicts a flow diagram of a method 300 for verifying an identity of a new user 210 of the equipment online marketplace network 204. In an initial step 305, the server 104 executing the equipment online marketplace platform 102 may receive, through network 108, a request from a new user 210 to join the equipment online marketplace network 204 to trade equipment through the equipment online marketplace platform 102. In one embodiment, the new user 210 may be one or more members of an aerospace organization, such as an airline, an airport, an aircraft manufacturer, an aerospace original equipment manufacturer, or any other type of aerospace organization that sells or buys aerospace equipment. In one embodiment, the equipment may include aircraft, aerospace parts and components, and/or time-constrained aerospace services, such as airport gates.

In step 310, server 104 may broadcast a message to existing users of the equipment online marketplace network 204 to verify and endorse an identity of the new user 210 to allow the new user 210 to join the equipment online marketplace network 210 to trade equipment through the equipment online marketplace platform 102. In one embodiment, the identity of the new user 210 may include a name of the organization and a DUN number ID for the organization. In one embodiment, the server 104 may verify the identity of the new user 210 by using smart contracts to verify the name of the organization and the DUN number ID of the organization. In one embodiment, the existing users may include one or more members of an aerospace organization, such as an airline, an airport, an aircraft manufacturer, an aerospace original equipment manufacturer, or any other type of aerospace organization that sells or buys aerospace equipment. In one embodiment, the server 104 may select a predetermined number of existing users to verify and endorse the identity of the new user 210 and the server 104 may broadcast the message to the select existing users to verify and endorse the identity of the new user 210.

In step 315, server 104 may receive endorsements of the identity of the new user 210 from the existing users through the equipment online marketplace platform 102.

In step 320, server 104 may determine whether the identity of the new user 210 has been endorsed by a threshold number of existing users. For example, if the identity of the new user 210 has not been endorsed by the threshold number of existing users (step 320: NO), server 104 may deny the new user 210 to join the equipment online marketplace network 204 (step 325). However, if the identity of the new user 210 is endorsed by the threshold number of existing users (step 320: YES), server 104 may permit the new user 210 to join the equipment online marketplace network 204 to trade equipment through the equipment online marketplace platform 102 (step 330). In one embodiment, the threshold number of existing users includes at least fifty-one percent (51%) of existing users.

In step 335, server 104 may store the identity of the new user 210 as a blockchain entry in a shared ledger 106. Thus, the new user 210 may be added to the equipment online marketplace network 204 and the new user 210 may be allowed to sell or buy equipment through the equipment online marketplace platform 102. In one embodiment, the new user 210 and the existing users may be sellers or buyers of equipment. In one embodiment, permitting the new user 210 to trade equipment through the equipment online marketplace platform 102 may include permitting sellers to sell equipment through the equipment online marketplace platform 102. In one embodiment, permitting the new user 210 to trade equipment through the equipment online marketplace platform 102 may include permitting buyers to buy equipment through the equipment online marketplace platform 102.

Figure 4:
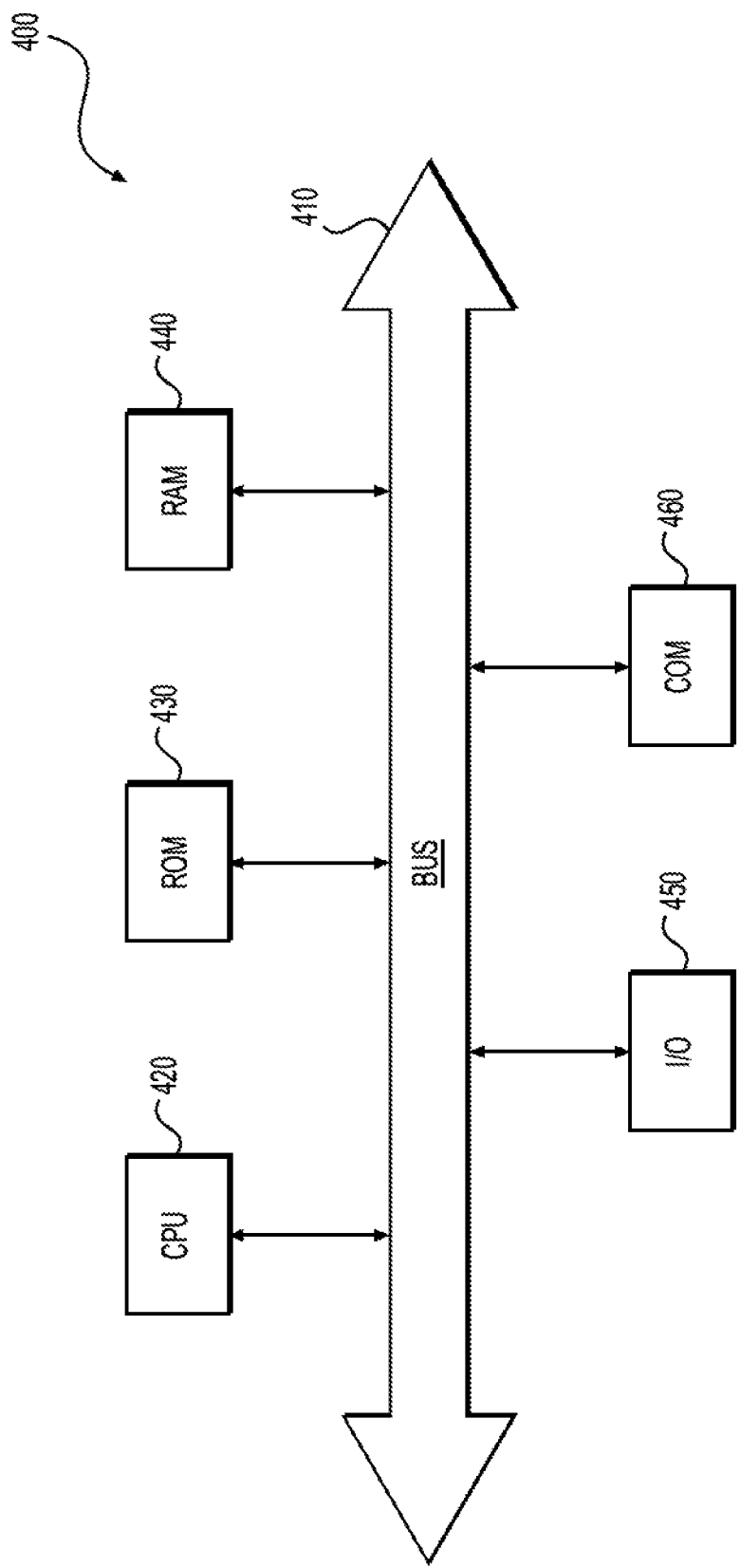
FIG. 4 depicts an example system that may execute techniques presented herein.

FIG. 4 depicts an example system 400 that may execute techniques presented herein. FIG. 4 is a simplified functional block diagram of a computer that may be configured to execute techniques described herein, according to exemplary embodiments of the present disclosure. Specifically, the computer (or "platform" as it may not be a single physical computer infrastructure) may include a data communication interface 460 for packet data communication. The platform also may include a central processing unit ("CPU") 420, in the form of one or more processors, for executing program instructions. The platform may include an internal communication bus 410, and the platform also may include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

Other embodiments of the disclosure will be apparent to those skilled in the art from consideration of the specification and practice of the invention disclosed herein. It is intended that the specification and examples be considered as exemplary only, with a true scope and spirit of the disclosure being indicated by the following claims.

What is claimed is:

1. A computer-implemented method for verifying an identity of a new user of an equipment online marketplace platform, the method comprising:
   receiving, through a network by a server executing the equipment online marketplace platform, a request from a new user to join an equipment online marketplace network to trade equipment through the equipment online marketplace platform;
   broadcasting, by the server based on the received request, a message to a plurality of existing users to verify and endorse an identity of the new user to allow the new user to join the equipment online marketplace network to trade equipment through the equipment online marketplace platform;
   receiving, by the server based on the broadcast message, endorsements of the identity of the new user from the existing users through the equipment online marketplace platform;
   determining, by the server based on the received endorsements, whether the identity of the new user is endorsed by a threshold number of existing users among the plurality of existing users; and
   based on the determining, when the identity of the new user is endorsed by the threshold number of existing users among the plurality of existing users, permitting, by the server, the new user to join the equipment online marketplace network and trade equipment through the equipment online marketplace platform, and storing, by the server, the identity of the new user as a blockchain entry in a shared ledger,
   wherein the computer-implemented method for verifying an identity of a new user of an equipment online marketplace platform streamlines a process of establishing a trusted user relative to methods that do not implement the computer-implemented method for verifying an identity of a new user of an equipment online marketplace platform.

2. The method of claim 1, wherein the equipment includes aircraft, aerospace parts and components, and time-constrained aerospace services.

3. The method of claim 1, wherein the new user is a member of an aerospace organization including at least one of an airline, an airport, an aircraft manufacturer, or an aerospace original equipment manufacturer.

4. The method of claim 3, wherein the identity of the new user includes a name of the organization and a DUN number ID for the organization.

5. The method of claim 4, further comprising:
   verifying, by the server, the identity of the new user by using smart contracts to verify the name of the organization and the DUN number ID for the organization.

6. The method of claim 1, wherein the existing users are members of aerospace organizations including at least one of airlines, airports, aircraft manufacturers, or aerospace original equipment manufacturers.

7. The method of claim 1, further comprising:
   selecting, by the server, a predetermined number of existing users to verify and endorse the identity of the new user,
   wherein broadcasting, by the server, a message to existing users to verify and endorse an identity of the new user includes broadcasting, by the server, a message to the select existing users to verify and endorse the identity of the new user.

8. The method of claim 1, wherein the threshold number of existing users includes at least 51% of existing users.

9. The method of claim 1, wherein the new user and the existing users are at least one of sellers and buyers of equipment.

10. The method of claim 9, wherein the sellers are permitted to sell equipment through the online equipment marketplace platform; and
    the buyers are permitted to buy equipment through the online equipment marketplace platform.

11. A system for verifying an identity of a new user of an equipment online marketplace platform, comprising:
    a memory having processor-readable instructions therein; and
    at least one processor configured to access the memory and execute the processor-readable instructions, which when executed by the at least one processor configures the at least one processor to perform a plurality of functions, including functions for:
       receiving, through a network by a server executing the equipment online marketplace platform, a request from a new user to join an equipment online marketplace network to trade equipment through the equipment online marketplace platform;
       broadcasting, by the server based on the received request, a message to a plurality of existing users to verify and endorse an identity of the new user to allow the new user to join the equipment online marketplace network to trade equipment through the equipment online marketplace platform;
       receiving, by the server based on the broadcast message, endorsements of the identity of the new user from the existing users through the equipment online marketplace platform;
       determining, by the server based on the received endorsements, whether the identity of the new user is endorsed by a threshold number of existing users among the plurality of existing users;
       based on the determining, when the identity of the new user is endorsed by the threshold number of existing users among the plurality of existing users, permitting, by the server, the new user to join the equipment online marketplace network and trade equipment through the equipment online marketplace platform, and storing, by the server, the identity of the new user as a blockchain entry in a shared ledger; and
       based on the determining, when the identity of the new user is not endorsed by the threshold number of existing users among the plurality of existing users, denying, by the server, the new user to join the equipment online marketplace network,
    wherein the at least one processor is configured to streamline a process of establishing a trusted user relative to systems that do not implement the system for verifying an identity of a new user of an equipment online marketplace platform.

12. The system of claim 11, wherein the equipment includes aircraft, aerospace parts and components, and time-constrained aerospace services.

13. The system of claim 11, wherein the new user is a member of an aerospace organization including an airline, an airport, an aircraft manufacturer, or an aerospace original equipment manufacturer.

14. The system of claim 13, wherein the identity of the new user includes a name of the organization and a DUN number ID for the organization.

15. The system of claim 14, wherein the plurality of functions further include functions for:

verifying, by the server, the identity of the new user by using smart contracts to verify the name of the organization and the DUN number ID for the organization.

16. The system of claim 11, wherein the existing users are members of aerospace organizations including airlines, airports, aircraft manufacturers, or aerospace original equipment manufacturers.

17. The system of claim 11, wherein the plurality of functions further include functions for:
   selecting, by the server, a predetermined number of existing users to verify and endorse the identity of the new user,
   wherein broadcasting, by the server, a message to existing users to verify and endorse an identity of the new user includes broadcasting, by the server, a message to the select existing users to verify and endorse the identity of the new user.

18. The system of claim 11, wherein the threshold number of existing users includes at least 51% of existing users.

19. The system of claim 11, wherein the new user and the existing users are at least one of sellers and buyers of equipment.

20. A non-transitory computer-readable medium containing instructions for facilitating equipment trading through an equipment online marketplace platform, comprising:
   receiving, through a network by a server executing the equipment online marketplace platform, a request from a new user to join an equipment online marketplace network to trade equipment through the equipment online marketplace platform;
   broadcasting, by the server based on the received request, a message to a plurality of existing users to verify and endorse an identity of the new user to allow the new user to join the equipment online marketplace network to trade equipment through the equipment online marketplace platform;
   receiving, by the server based on the broadcast message, endorsements of the identity of the new user from the existing users through the equipment online marketplace platform;
   determining, by the server based on the received endorsements, whether the identity of the new user is endorsed by a threshold number of existing users among the plurality of existing users;
   based on the determining, when the identity of the new user is endorsed by the threshold number of existing users among the plurality of existing users, permitting, by the server, the new user to join the equipment online marketplace network and trade equipment through the equipment online marketplace platform, and storing, by the server, the identity of the new user as a blockchain entry in a shared ledger; and
   based on the determining, when the identity of the new user is not endorsed by the threshold number of existing users among the plurality of existing users, denying, by the server, the new user to join the equipment online marketplace network,
   wherein the instructions for facilitating equipment trading through an equipment online marketplace platform are configured to streamline a process of establishing a trusted user relative to systems that do not implement the instructions for facilitating equipment trading through an equipment online marketplace platform.

\* \* \* \* \*